(12) United States Patent
Sekiguchi (10) Patent No.: US 6,433,886 B1
(45) Date of Patent: Aug. 13, 2002

(54) IMAGE FORMING METHOD AND IMAGE FORMING APPARATUS

(75) Inventor: Atsushi Sekiguchi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/384,006

(22) Filed: Aug. 26, 1999

(30) Foreign Application Priority Data

Aug. 31, 1998 (JP) .......................................... 10-245280

(51) Int. Cl.$^7$ .............................................. G06F 12/00
(52) U.S. Cl. .................... 358/1.16; 358/1.12; 358/1.18; 358/444; 358/496; 358/498
(58) Field of Search ................................ 358/1.16, 444, 358/404, 496, 498, 1.12, 1.18; 707/527

(56) References Cited

U.S. PATENT DOCUMENTS 4,802,229 A * 1/1989 Yamada ........................ 358/406
6,163,784 A * 12/2000 Taguchi ........................ 707/521

FOREIGN PATENT DOCUMENTS

JP          7-336522     12/1995

* cited by examiner

Primary Examiner—Edward Coles
Assistant Examiner—Alan Rahimi (57) ABSTRACT

An image forming apparatus includes a document feeder having a stand on which documents are placed and a pair of guide members which move from a center of the stand to sides of the stand. The document feeder feeds a document such that the center of the document moves approximately along the center of the stand. An image reader reads the document to obtain document-shaped image data. An image processor has a memory region to store the document-shaped image data. The memory region has a width whose center approximately conforms with the center of the document-shaped image data. When the image processor conducts an image processing, the document-shaped image data is shifted toward one side of the memory region so that one side of the document-shaped image data is approximately conformed with a reference side of the memory region.

9 Claims, 10 Drawing Sheets

IMAGE FORMING METHOD AND IMAGE FORMING APPARATUS

BACKGROUND OF THE INVENTION

The present invention relates to an image forming method and an image forming apparatus, and specifically to improvement in the relationship between the reference position in which an original document is read and its image processing.

In copying apparatuses and scanners, there are one case in which an original document is placed on a glass platen and is read, and also another case in which the original document is conveyed onto the glass platen by an automatic document feeder (ADF) and is then read.

Further, by employing an apparatus called a duplex document feeder (DDF), an original document under conveyance may be read while holding the image sensor.

Further, when an original document is placed on the glass platen, the reference position for placing the original document may be either at one edge of the glass platen or at the center thereof. Furthermore, when an original document is conveyed employing ADF or DDF, the reference position for conveying the original document is in the same manner, namely either at one edge of the glass platen, or at the center thereof.

In ADF and DDF, when conveyance is carried out utilizing the center of the conveyance path as the reference, stable conveyance may be achieved because conveyance force can be evenly applied to both the right and left sides of an original document, to tend to result in linear motion. On the other hand, when the original document is placed on the glass platen while employing one edge of the glass platen as the reference position for placement of the same, it is possible to provide a positioning member at the edge thereof and to position the original document while being brought into close contact with the edge of the member. Thus, positioning is readily carried out and operability is enhanced. Based on these factors, Japanese Patent Publication Open to Public Inspection No. 7-336522 discloses that the reference position is altered in such a manner that when conveyed by ADF, the center is utilized as the reference, and when an original document is placed on the glass platen, one edge of the glass platen is employed as the reference position.

In such a case, the reference position of image data read from an original document placed on the glass platen is different from that of image data read from an original document conveyed by ADF and DDF. As a result, variable magnification process (enlarging process and reduction process) becomes complicated.

Further, when mixed-size original documents are successively read employing DDF or ADF provided with a pair of guide plates which are symmetrically widened in equal amounts of movement from the center to both sides, small-sized original documents are positioned so as to be in contact with one of the guide plates. Namely, there may exist original documents which are positioned in the center reference and are deviated somewhat from the center.

When image data generated by reading such mixed-size original documents are subjected to variable magnification process, the process becomes complicated due to the required correction of the reference position. Further, when the sizes of original documents are different, the process becomes more complicated due to the difference in a correction amount according to the difference in size.

SUMMARY OF THE INVENTION

In view of the above-mentioned technical problems, the present invention is accomplished. An object of the present invention is to provide an image forming method and an image forming apparatus in which an original document conveying means is employed, which is comprised of a pair of original document guides which are symmetrically widened from the center to both sides in equal amounts of movement, and the original document under conveyance is read, and when variable magnification process is carried out, no further complicated process is required.

The above-mentioned problems can be solved by the following structure and the following method:

An image forming apparatus comprises:
  a document feeder having a stand on which documents are placed and a pair of guide plates which move from a center of the stand to sides of the stand, whereby the document feeder feeds a document by using the pair of guide plates in such a way that the center of the document is moved approximately along the center of the stand;
  an image reader to read the document so as to obtain document-shaped image data; and
  an image processor having a memory region to store the document-shaped image data, the memory region having a width whose center is arranged to approximately conform with the center of the document-shaped image data;
  wherein when the image processor conducts an image processing, the image processor shifts the document-shaped image data toward one side of the memory region so that one side of the document-shaped image data is approximately conformed with a reference side of the memory region.

An image forming method, comprises steps of:
  feeding a document placed on a stand by using a pair of guide plates which move from a center of the stand to sides of the stand in such a way that the center of the document is moved approximately along the center of the stand;
  reading an image on the document by a reading section so as to obtain document-shaped image data; and
  storing the document-shaped image data in a memory region having a width whose center is arranged to approximately conform with the center of the document-shaped image data; and
  shifting the document-shaped image data toward one side of the memory region when the image processor conducts an image processing so that one side of the document-shaped image data is approximately conformed with a reference side of the memory region.

Further, the above-mentioned problems may be solved by the following preferable structure and the following preferable method:

(1) an image forming method characterized in that an original document is conveyed employing a pair of original document guides which are symmetrically widened from the center to both sides in equal amounts of movement, image data are generated while reading the original document under conveyance, and after shifting the generated image data of said original document to the reference edge, image processing is executed.

Furthermore, an image forming apparatus characterized in comprising an original document conveying means employing a pair of original document guides which are symmetrically widened from the center to both sides in equal amounts of movement, a reading means which reads the original document under conveyance employing the above-mentioned original document conveying means, and an image processing means which shifts the original document image data generated by the above-mentioned reading means to the reference edge, and executes image processing.

In these inventions, when image data are generated by reading the original document under conveyance employing a pair of original document guides which are symmetrically widened from the center to both sides in equal amounts of movement, image processing is executed after shifting the generated original document image data to the reference edge side. Thus calculation in data processing for image processing such as variable magnification process will be readily carried out. Further, even for mixed-size original documents, position correction is not required because original documents are shifted to the reference edge.

DESCRIPTION OF THE PREFERRED EMBODIMENTS

Examples of the embodiments of the present invention will be detailed below.

<Structure of Image Forming Apparatus>

First, the entire structure employed in the example of the present embodiment is described with reference to FIG. 1. Further, said FIG. 1 is a functional block diagram showing the entire schematic electrical structure of image forming apparatus 1 of the embodiment of the present invention.

Figure 1:
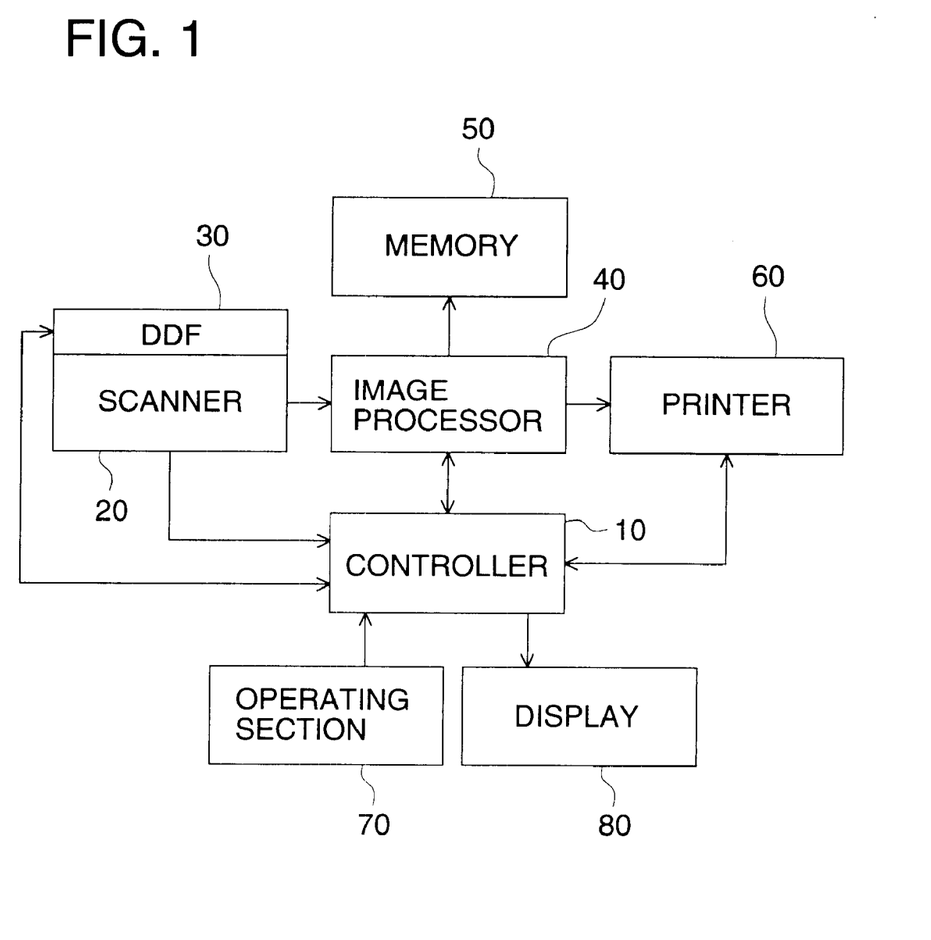
FIG. 1 is a block diagram showing the system of an image forming apparatus of the example of the embodiment of the present invention.

Further, in this FIG. 1, reference numeral 10 is a controller which controls the entire apparatus, 20 is a scanner which reads an original document, 30 is DDF which conveys the original document with respect to the scanner 20, 40 is an image processor which executes image processing including variable magnification process, 50 is a memory which stores image data generated through reading in the scanner 20, 60 is a printer which forms an image on a recording sheet based on the image data, 70 is an operating section which carries out various types of operations related to image formation, and 80 is a display which shows various stages in the operation of the apparatus.

Figure 2:
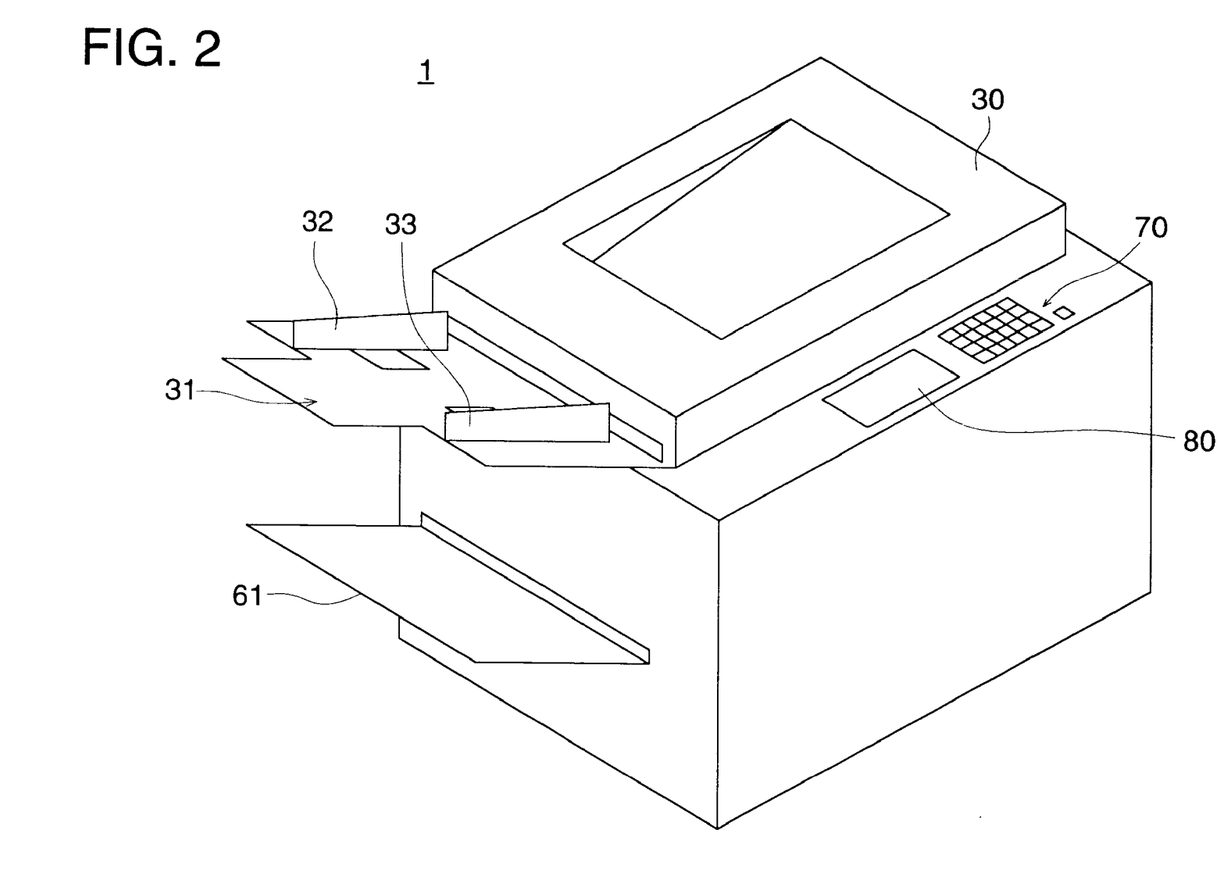
FIG. 2 is a perspective view of the external structure of an image forming apparatus of the example of the embodiment of the present invention.

FIG. 2 is a perspective view showing the external structure of the image forming apparatus 1, and shows the status in which an original document is read employing the DDF 30. Further, when not employing the DDF 30, an original document placed on a glass platen is read, reading is carried out by lifting the DDF 30 upward.

Namely, in such an example of the embodiment, it is understood that both cases are possible in which the scanner 20 reads an original document in such a manner that the original document is placed on a glass platen while one edge of the glass platen is assigned as a reference edge, and an original document under conveyance is read employing DDF 30 provided with a pair of original document guides which are symmetrically widened from the center to both sides in equal amounts of movement.

In this FIG. 2, original document placing stand 31 is provided, which is employed to position the original documents which are conveyed by the DDF 30, and in this original document placing stand 31, a pair of original document guides 32 and 33 are provided which are symmetrically widened from the center to both sides in equal amounts of movement. Further, in FIG. 2, reference numeral 61 is a paper ejection section which ejects recording sheets on which images have been formed in the printer 60.

Figure 3:
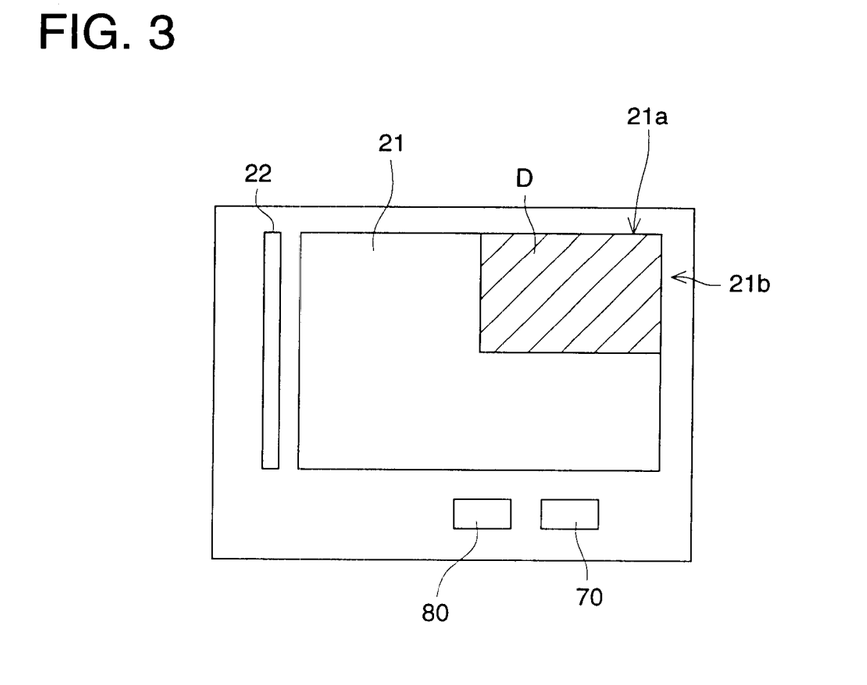
FIG. 3 is a descriptive view showing the status of reading an original document on a glass platen in the example of the embodiment of the present invention.

FIG. 3 exemplifies the status in which original document D is placed on the glass platen 21 in the image forming apparatus 1. Here, if both the display 80 and the operating section 70 are positioned in the front side of the image forming apparatus 1, in the example as shown herein, the right rear edge of the glass platen 21 becomes the reference position for the placement of an original document. Further, when original document D is placed onto the glass platen 21, reading is carried out so that a light source and a line sensor (neither of which is shown) scan from the right to the left.

Furthermore, DDF reading glass 22 in FIG. 3 is composed of high abrasion resistant glass which makes it possible to pass original documents conveyed by the DDF 30. Just below this DDF reading glass 22, the light source and the line sensor (neither of which is shown) are held and reading is carried out by moving the original document D.

Figure 4:
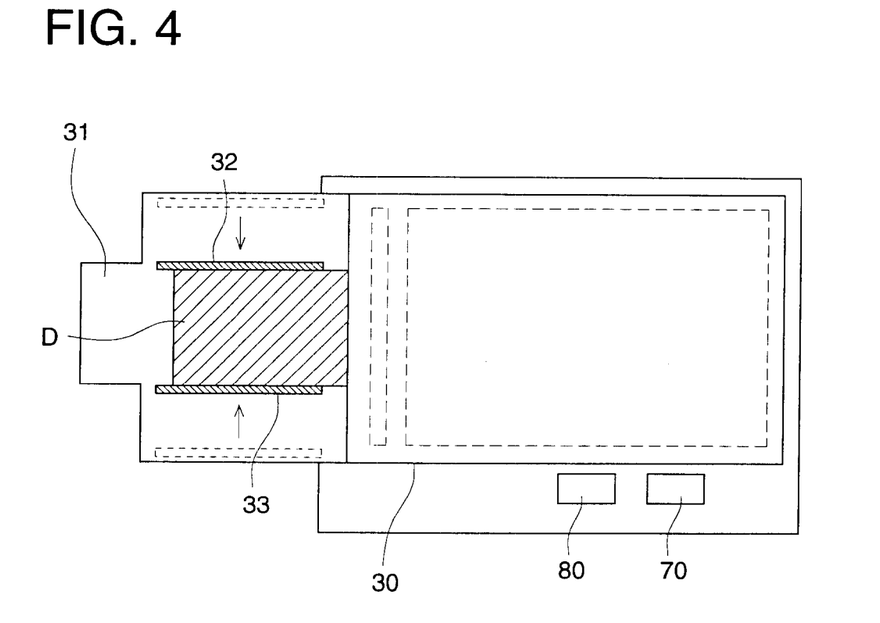
FIG. 4 is a descriptive view showing the status of reading an original document conveyed by DDF in the example of the embodiment of the present invention.

FIG. 4 shows the status of arranging the DDF 30, and also shows the status in which original document D is positioned employing a pair of original document guides 32 and 33 which are symmetrically widened from the center to both sides in equal amounts of movement.

Operation of the example of the embodiment of the present invention will now be described with reference to the flowchart in FIG. 5.

Figure 5:
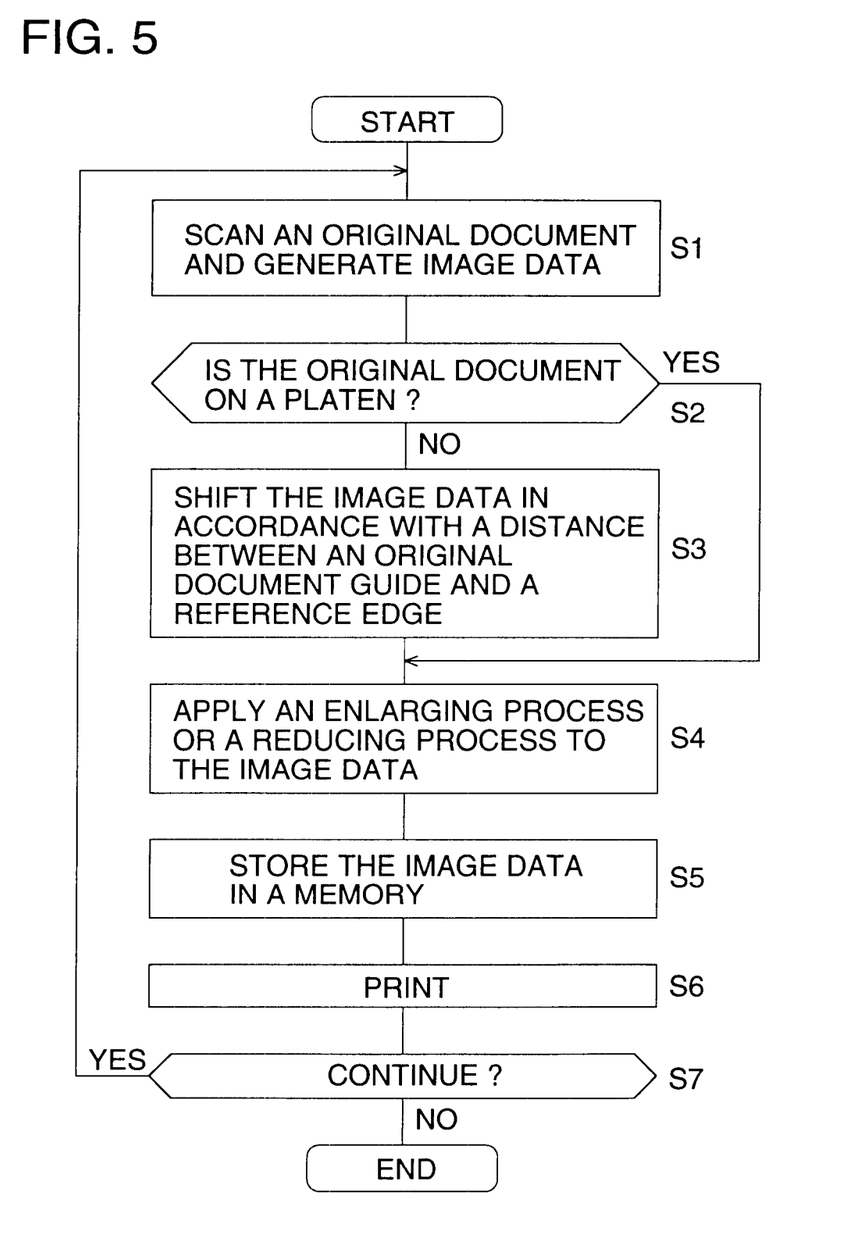
FIG. 5 is a flowchart showing operations of the example of the embodiment of the present invention.

First, original document D is scanned by the scanner 20 to generate image data (S1 in FIG. 5).

Figure 6A:
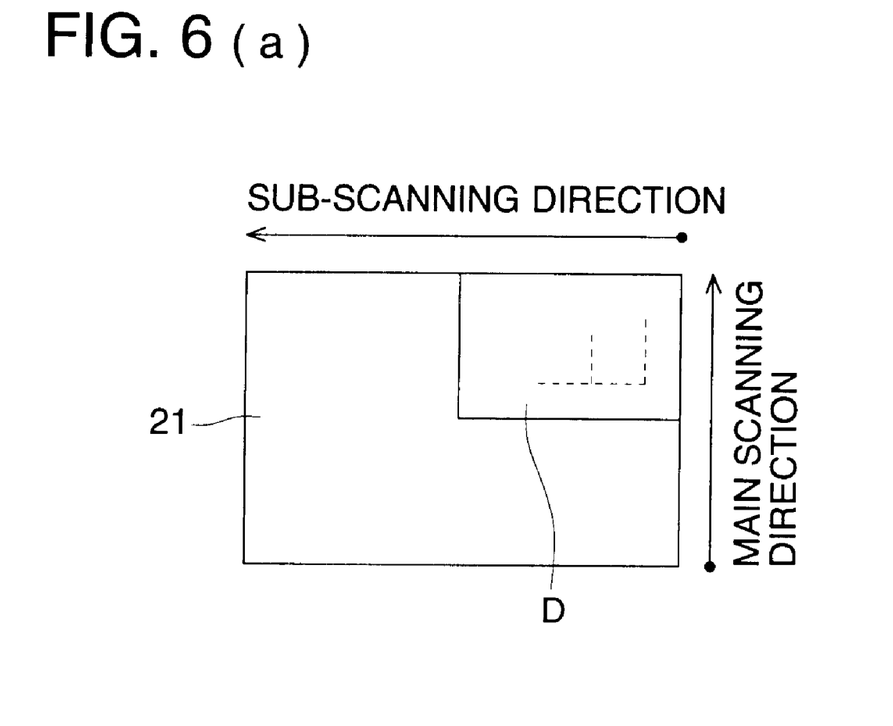
FIGS. 6(a) and 6(b) are descriptive views showing the status of image data when an original document is read in the example of the embodiment of the present invention.
Figure 6B:
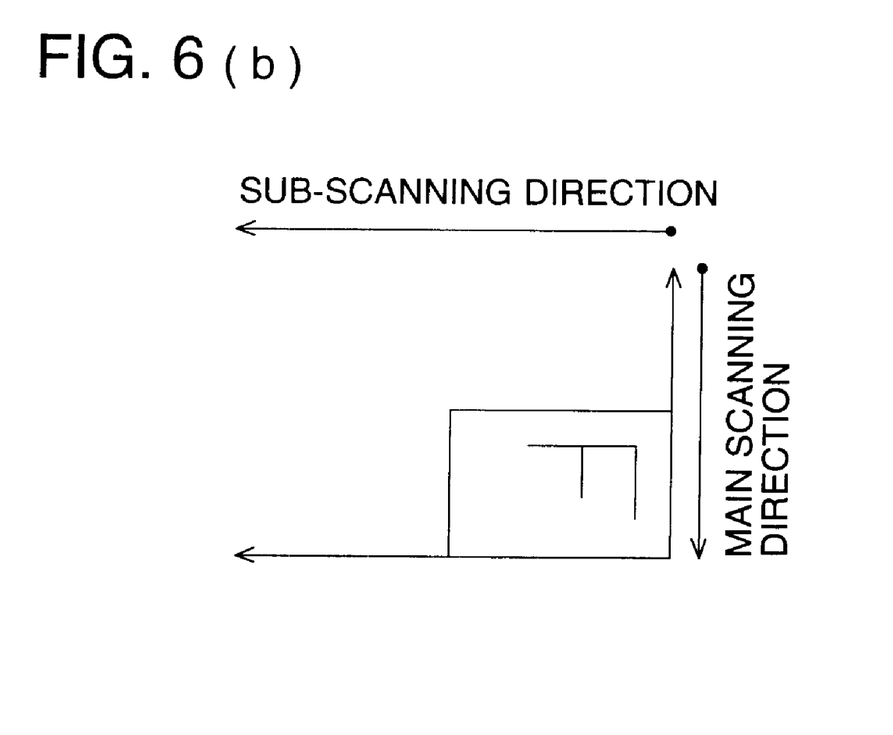

Herein, when the original document D is placed on the glass platen 21, scanning is carried out under the status shown in FIG. 6(a). Further, because the original document surface to be read is placed face down, a letter described on the surface to be read is shown employing a broken line. Herein, it is assumed that F of the alphabet exists on an original document placed in the longitudinal direction. In this case, in terms of the main memory of the image processor 40, the status is such as shown in FIG. 6(b). In such a case, the end of main scanning and the top of sub-scanning become the reference positions for variable magnification process.

Figure 7:
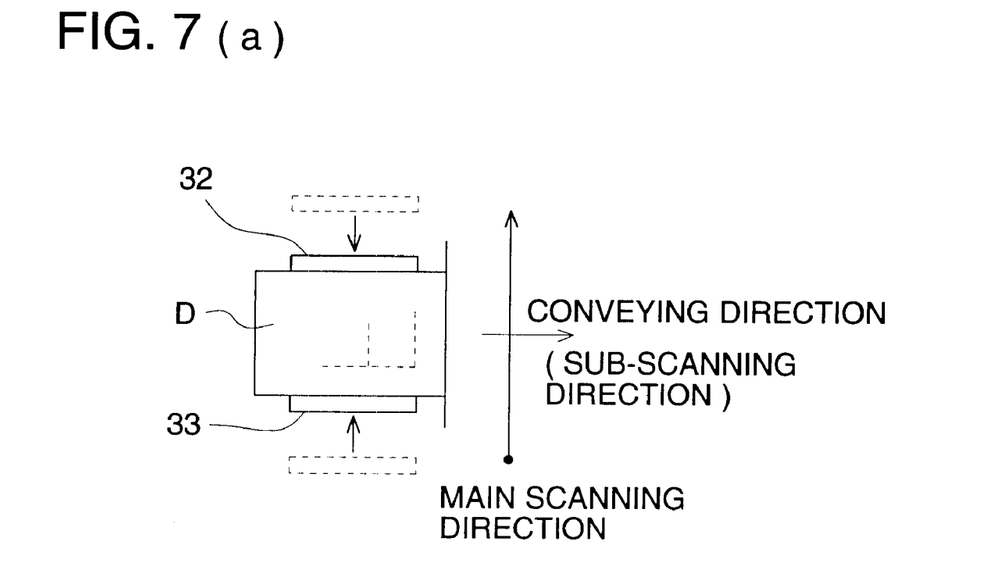
FIGS. 7(a) and 7(b) are descriptive views showing the status of image data when an original document conveyed by DDF is read in the example of the embodiment of the present invention.

Furthermore, when the original document D is placed on the original document placing stand 31, the status is such as shown in FIG. 7(a). Scanning is carried out during the period of conveyance of the original document D which passes on the DDF reading glass 22 shown in FIG. 3. Further, because the original document surface to be read is placed face down, a letter described on the surface to be read is shown employing a broken line. Herein, it is assumed that F of the alphabet exists on an original document placed in the longitudinal direction. In this case, in terms of the main memory of the image processor 40; the status is such as shown in FIG. 7(b). In the status as it is, the center of main scanning and the top of sub-scanning become reference positions for the variable magnification process.

Figure 8:
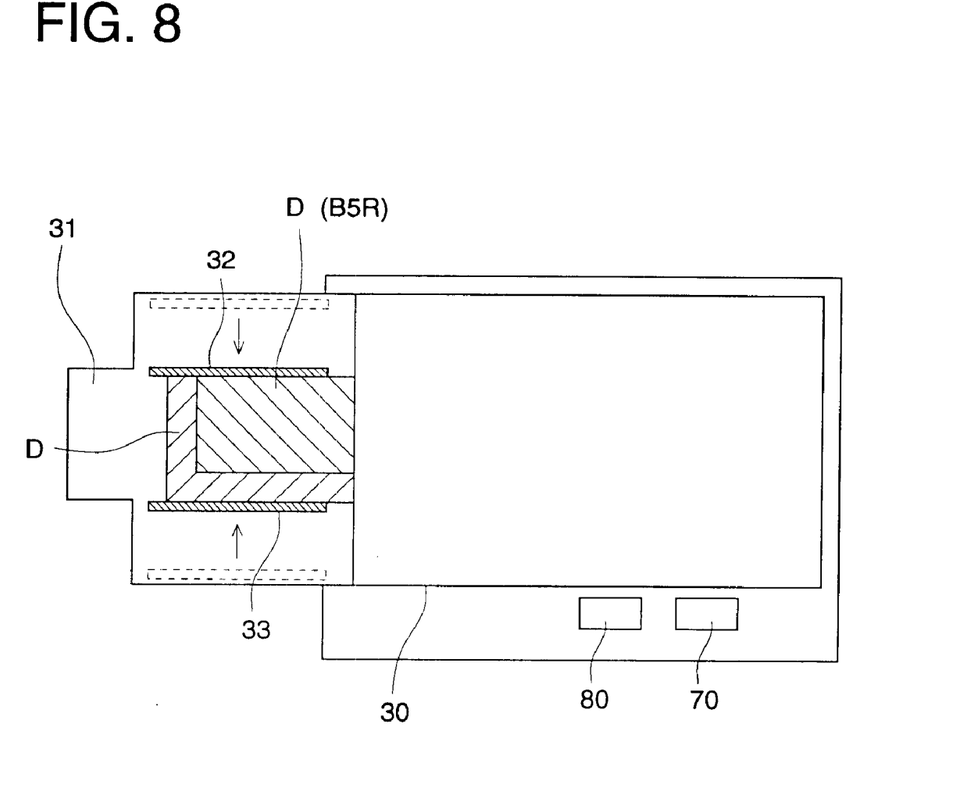
FIG. 8 is a descriptive view showing the status of reading mixed-size original documents conveyed by DDF in the example of the embodiment of the present invention.

Further, when mixed-size original documents are read by the DDF 30, it is impossible to position small-sized original documents (B5R original documents, if A4R and B5R original documents are mixed) to the center as the reference. Accordingly, as shown in FIG. 8, the original documents are brought into contact with the original document guide 32 of the two guides. In this case, when the original document is placed on the glass platen 21, the right rear is a reference position. Therefore, for the image data shift process described below, in accordance with the above-mentioned factor, the original document guide located in the rear is preferably employed as the reference. By so doing, even though mixed-size original documents are placed, the shift width becomes constant irrespective of the size of original documents.

Figure 9A:
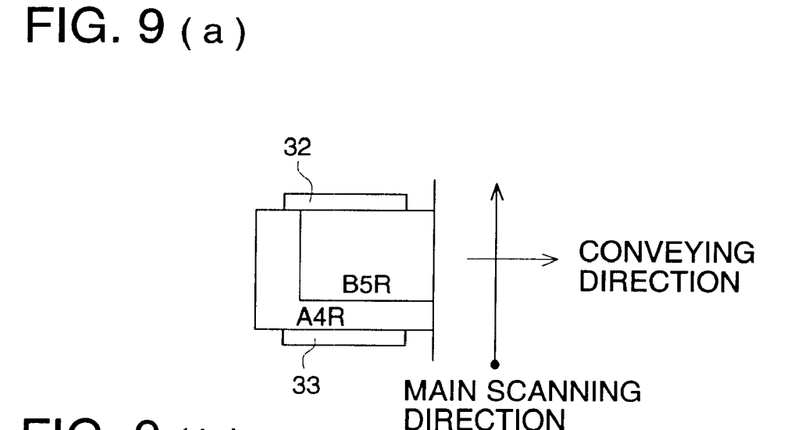
FIGS. 9(a) to 9(c) are descriptive views showing the status conducting variable magnification process upon reading mixed-size original documents conveyed by DDF in the example of the embodiment of the present invention.
Figure 9B:
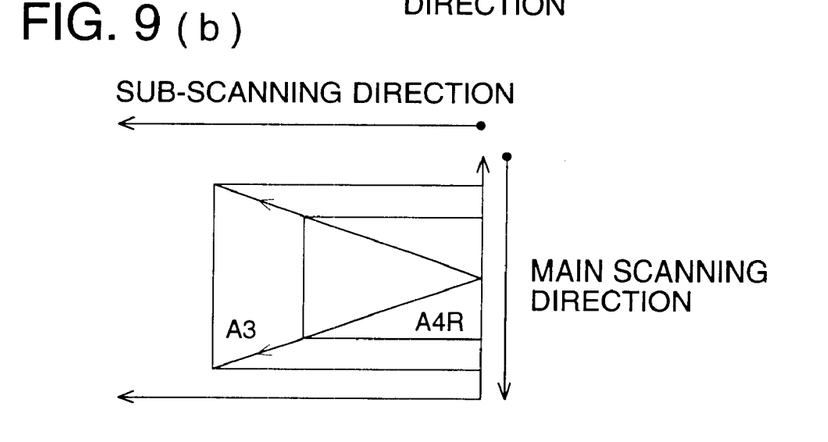

When mixed-size original documents conveyed by the DDF 30 are read, and when variable magnification process is carried out in the image processor 40, the status of image data will now be described with reference to FIG. 9. FIG. 9(a) schematically illustrates the status of an original document which is placed identically as the above-described FIG. 8, employing A4R and B5R original documents. Such image data generated by the conveyance of the DDF 30 are also shown in FIG. 7(b), and the top of the sub-scanning direction and the center of the main scanning direction become reference positions. Thus, in order to carry out enlargement magnification process to A3 from A4R, enlargement is carried out employing the reference positions as the origin as shown in FIG. 9(b).

Figure 9C:
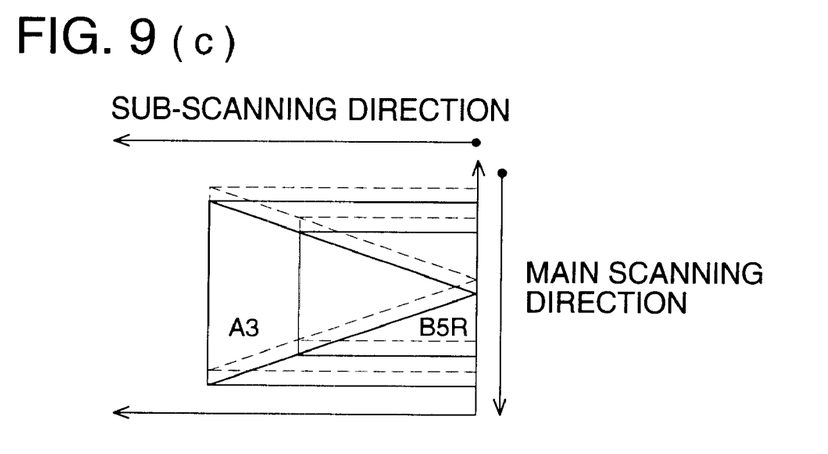

B5R original documents mixed with A4R ones are oriented properly employing the original document guide 32 located in the rear of the main scanning direction. Thus, image data are generated in the B5R position shown by a solid line in FIG. 9(c). In this case, the reference position is the center of the main scanning of B5R which is deviated to one side. Therefore, the reference position of B5R is deviated from that of A4R. Further, in this FIG. 9(c), the solid line shows B5R and enlarged A3, while the broken line shows A4R and enlarged A3, and thereby the difference in the reference positions and the difference in positions of enlarged image data due to the difference in positions are clarified.

Accordingly, when original document D, conveyed by the DDF 30, is read (NO at S2 in FIG. 5), image data generated by reading are subjected to movement (shifting) (S3 in FIG. 5). FIG. 10 shows such a status.

Figure 10A:
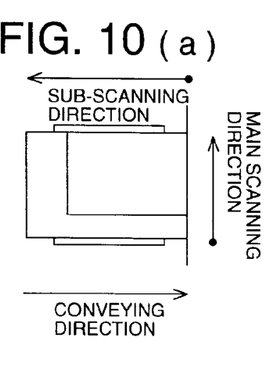
FIGS. 10(a) to 10(g) are descriptive views showing the status of conducting a variable magnification process after performing shift upon reading mixed-size original documents conveyed by DDF in the example of the embodiment of the present invention.
Figure 10B:
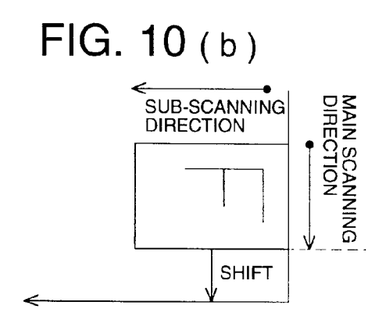
Figure 10C:
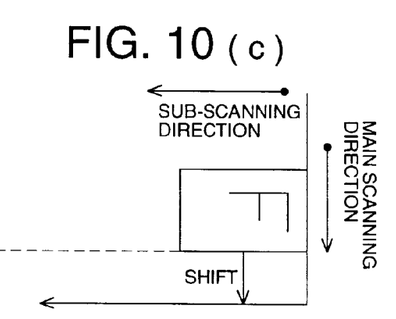

FIG. 10(a) shows the status of mixed-size original documents in the DDF 30 arranged in the same manner as the above-mentioned FIG. 9(a). FIG. 10(b) shows the position of an A4R original document, and FIG. 10(c) shows the position of image data of said A4R original document.

Herein, the difference x between the reference edge (the side of guide 32) and the reference edge (the rear of the glass platen 21) of an original document on the glass platen 21 is detected by a position sensor (not shown) provided near the original document guide 32. The obtained x is then transmitted to the controller 10.

Figure 10D:
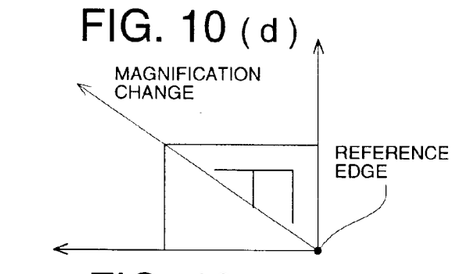
Figure 10E:
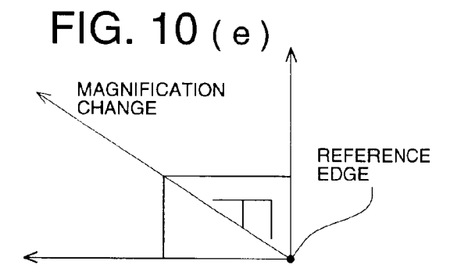

Subsequently, according to the instruction of the controller 10, the main memory of the image processor 40 shifts image data by the amount based on the above-mentioned x. Thus, A4R image data become as shown in FIG. 10(d), and B5R image data become as shown in FIG. 10(e). Namely, the end of the main scanning and the top of the subscanning become reference positions.

Figure 10F:
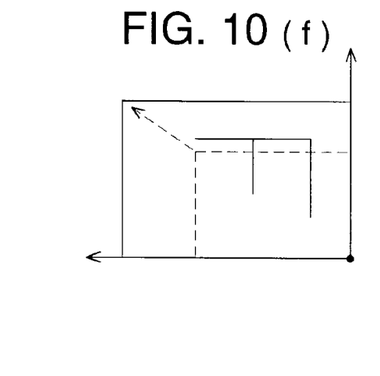
Figure 10G:
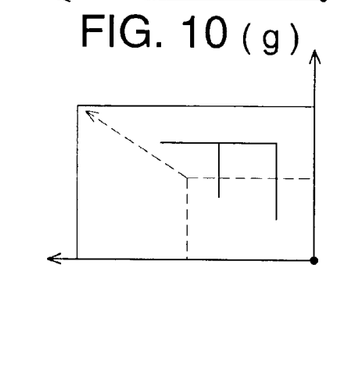
Figure 11:
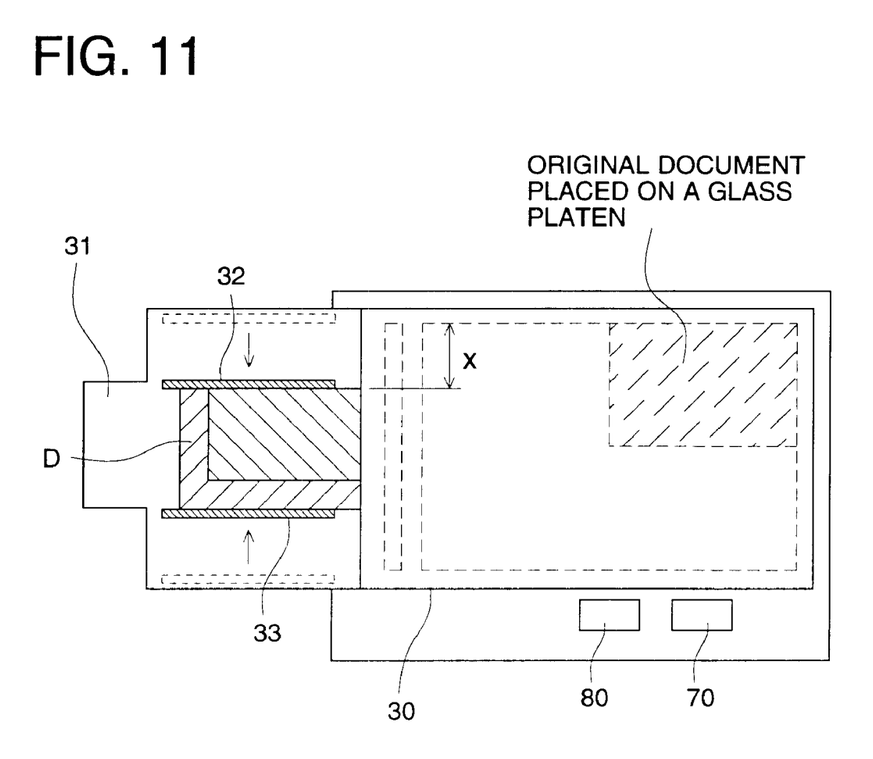
FIG. 11 is a descriptive view for obtaining a shift amount, when mixed-size original documents conveyed by DDF are read followed by realizing the shift in the example of the embodiment of the present invention and shift is performed.

The controller 10 under such a status executes variable magnification processes such as enlargement, reduction, and the like (S4 in FIG. 5). In this case, as shown in FIGS. 10(f) and 10(g), A4R image data, as well as B5R image data, can be subjected to variable magnification processes employing the same reference position as a center, and no position deviation occurs.

Further, the obtained reference position becomes equal to the image data which are generated by reading the original document on the glass platen 21, shown previously in FIG. 6 and the same variable magnification processes may be applied to the image data prepared by not employing the DDF 30 (YES at S2 to S4 in FIG. 5 ).

The image data subjected to the variable magnification processes, as described above, are stored in the memory 50 (S5 in FIG. 5), and in the printer 60, are printed onto recording paper. If original documents to be read and printed remain, the same processes are repeated (S7 to S1 in FIG. 5). If no original document remains, the process is completed (YES at S7 to END in FIG. 5).

As described above, when image data are generated by reading a conveyed original document, employing an original document guides which are equally widened from the center, by shifting the generated image data of the original document to the reference edge, calculation for variable magnification process is easily made. Furthermore, when mixed-size original documents are employed, correction for the position is not required due to the shift to the reference edge.

Further, in the above explanation, A4R and B5R original documents are employed as specific examples, however, the present invention is not limited to these sizes. Further, in mixed-size original documents, at least 3 different-sized original documents may be mixed.

Further, herein, mixed-size original documents are brought into contact with the original document guide 32. However, the present invention may also be realized by contacting original documents with the original document guide 33. In such a case, the shift amount x' may be obtained by adding the value due to difference in size in the main scanning direction of the original document to the above-mentioned shift amount x.

Furthermore, the reference edge on the glass platen 21 is not limited to those shown in the above-mentioned examples of the embodiments, but the reference edge may also be located at other positions. In such a case, the amount of shift may be calculated upon adjusting to the altered reference edge.

Further, the above examples of the embodiments are shown for the image forming apparatus. However, the present invention may be similarly realized for an image reading apparatus provided with an image processor, a system in which an image reading apparatus and an image processing apparatus are combined, and the like.

As described above, according to the present invention, when an original document under conveyance is read employing original document guides which are equally widened from the center and image data are generated, calculation for variable magnification process is easily made because the image processing is executed after shifting the generated image data to the reference edge. Furthermore, when mixed-size original documents are employed, position correction is not required due to the shift to the reference edge.

What is claimed is:

1. An image forming apparatus, comprising:
    a document feeder having a stand on which documents are placed and a pair of guide members which move from a center of the stand to sides of the stand, whereby the document feeder feeds a document by using the pair of guide members in such a way that the center of the document is moved approximately along the center of the stand;
    an image reader to read the document so as to obtain document-shaped image data; and
    an image processor having a memory region to store the document-shaped image data, the memory region having a width whose center is arranged to approximately conform with the center of the document-shaped image data;
    wherein when the image processor conducts an image processing, the image processor shifts the document-shaped image data toward one side of the memory region so that one side of the document-shaped image data is approximately conformed with a reference side of the memory region.

2. The image forming apparatus of claim 1, wherein the image reader has a reading section whose center is approximately conformed with the center of the stand, and data read by the reading section is stored in the memory region in such a way that the center of the data corresponding to the center of the reading section is approximately conformed with the center of the memory region.

3. The image forming apparatus of claim 1, wherein the image reader reads the document while the document feeder feeds the document.

4. The image forming apparatus of claim 1, further comprising a glass platen having sides corresponding to the sides of the stand, wherein one of the sides is used as a reference side when a document is placed on the glass platen and the reference side of the memory region is arranged to conform with the reference side on the glass platen.

5. The image forming apparatus of claim 1, wherein the image processing is a magnification changing processing.

6. An image forming method, comprising steps of:
    feeding a document placed on a stand by using a pair of guide members which move from a center of the stand to sides of the stand in such a way that the center of the document is moved approximately along the center of the stand;
    reading an image on the document by a reading section so as to obtain document-shaped image data; and
    storing the document-shaped image data in a memory region having a width whose center is arranged to approximately conform with the center of the document-shaped image data; and
    shifting the document-shaped image data toward one side of the memory region when the image processor conducts an image processing so that one side of the document-shaped image data is approximately conformed with a reference side of the memory region.

7. The image forming method of claim 6, wherein in the reading step, the image on the document is read by the reading section while the document is fed to the reading section.

8. The image forming method of claim 6, wherein one of the sides of a glass platen is used as a reference side when a document is placed on the glass platen and the reference side of the memory region is arranged to conform with the reference side on the glass platen.

9. The image forming method of claim 6, wherein the image processing is a magnification changing processing.

* * * * *